US011551000B2

(12) United States Patent
Chang et al.

(10) Patent No.: US 11,551,000 B2
(45) Date of Patent: Jan. 10, 2023

(54) INTROSPECTIVE EXTRACTION AND COMPLEMENT CONTROL

(71) Applicants: INTERNATIONAL BUSINESS MACHINES CORPORATION, Armonk, NY (US); MASSACHUSETTS INSTITUTE OF TECHNOLOGY, Cambridge, MA (US)

(72) Inventors: Shiyu Chang, Elmsford, NY (US); Mo Yu, White Plains, NY (US); Yang Zhang, Cambridge, MA (US); Tommi S. Jaakkola, Burlington, MA (US)

(73) Assignees: INTERNATIONAL BUSINESS MACHINES CORPORATION, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 625 days.

(21) Appl. No.: 16/658,120

(22) Filed: Oct. 20, 2019

(65) Prior Publication Data

US 2021/0117508 A1  Apr. 22, 2021

(51) Int. Cl.
| | | |
|---|---|---|
| *G06N 3/08* | (2006.01) | |
| *G06F 40/279* | (2020.01) | |
| *G06F 17/18* | (2006.01) | |
| *G06K 9/62* | (2022.01) | |
| *G06N 20/20* | (2019.01) | |
| *G06N 3/04* | (2006.01) | |

(52) U.S. Cl.
CPC ............ *G06F 40/279* (2020.01); *G06F 17/18* (2013.01); *G06K 9/6256* (2013.01); *G06K 9/6277* (2013.01); *G06N 3/0454* (2013.01); *G06N 3/088* (2013.01); *G06N 20/20* (2019.01)

(58) Field of Classification Search
CPC ..... G06F 40/279; G06F 17/18; G06K 9/6256; G06K 9/6277; G06N 3/0454; G06N 3/088; G06N 20/20; G06N 3/0445
USPC .......................................................... 706/25
See application file for complete search history.

(56) References Cited

U.S. PATENT DOCUMENTS

| | | |
|---|---|---|
| 2019/0108448 A1 | 4/2019 | O'Malia et al. |
| 2019/0122146 A1 | 4/2019 | Meadows et al. |
| 2019/0130221 A1 | 5/2019 | Bose et al. |
| 2019/0130266 A1 | 5/2019 | Cao et al. |

(Continued)

OTHER PUBLICATIONS

Mcauley, J. et al., "Learning Attitudes and Attributes from Multi-Aspect Reviews"; arXiv:1210.3926v2 [cs.CL] Oct. 31, 2012, 11 pgs.

(Continued)

*Primary Examiner* — Charlotte M Baker
(74) *Attorney, Agent, or Firm* — Intelletek Law Group, PLLC; Gabriel Daniel, Esq.

(57) ABSTRACT

A method and system of training a natural language processing network are provided. A corpus of data is received and one or more input features selected therefrom by a generator network. The one or more selected input features from the generator network are received by a first predictor network and used to predict a first output label. A complement of the selected input features from the generator network are received by a second predictor network and used to predict a second output label.

24 Claims, 8 Drawing Sheets

(56) References Cited

U.S. PATENT DOCUMENTS

| | | | |
|---|---|---|---|
| 2019/0138847 A1 | 5/2019 | Shor et al. | |
| 2019/0189115 A1* | 6/2019 | Hori | G10L 15/183 |
| 2019/0236139 A1 | 8/2019 | DeFelice | |
| 2019/0266442 A1 | 8/2019 | Malur Srinivasan et al. | |
| 2020/0279288 A1* | 9/2020 | Song | G06N 3/0481 |
| 2020/0380339 A1* | 12/2020 | Branson | G16H 50/20 |
| 2021/0383067 A1* | 12/2021 | Reisswig | G06F 40/295 |

OTHER PUBLICATIONS

List of IBM Patents or Applications Treated as Related. (2 pgs.).

Yu, M. et al., "Rethinking Cooperative Rationalization: Introspective Extraction and Complement Control"; https://people.csail.mit.edu/tommi/papers/YCZJ_EMNLP2019.pdf; (2019); 13 pgs.

Alvarez-Melis, D. et al.,"Towards Robust Interpretability with Self-Explaining Neural Networks"; arXiv preprint arXiv:1806.07538; (2018); 10 pgs.

Andreas, J. et al., "Learning to Compose Neural Networks for Question Answering"; In Proceedings of NAACL-HLT (2016) 10 pgs.

Andreas, J. et al., "Neural Module Networks"; In Proceedings of the IEEE Conference on Computer Vision and Pattern Recognition (2016); 10 pgs.

Arumae, K. et al., "Guiding Extractive Summarization with Question-Answering Rewards"; Proceedings of NAACL-HLT (2019); pp. 2566-2577.

Bastings, J. et al., "Interpretable Neural Predictions with Differentiable Binary Variables"; arXiv preprint arXiv:1905.08160 (2019); 15 pgs.

Busoniu, L. "Multi-Agent Reinforcement Learning: A Survey"; In Proceedings of the 9th International Conference on Control, Automation, Robotics and Vision (2006), Singapore, 7 pgs.

Chen, J. et al., "Learning to Explain: An Information-Theoretic Perspective on Model Interpretation"; In Proceedings of the 35th International Conference on Machine Learning, Stockholm, Sweden (2018); 10 pgs.

Chen, J. et al., "L-Shapley and C-Shapley: Efficient Model Interpretation for Structured Data"; arXiv preprint arXiv:1808.02610 (2018); 17 pgs.

Goodfellow, I. et al., "Generative Adversarial Nets"; In Advances in neural information processing systems (2014), arXiv:1406.2661v1 [stat.ML] Jun. 10, 2014, 9 pgs.

Hendrickx, I. et al., "SemEval-2010 Task 8: Multi-Way Classification of Semantic Relations Between Pairs of Nominals"; In Proceedings of the Workshop on Semantic Evaluations: Recent Achievements and Future Directions (2009); 7 pgs.

Johnson, J. et al., "Inferring and Executing Programs for Visual Reasoning"; In Proceedings of the IEEE Conference on Computer Vision and Pattern Recognition 2989-2998 (2017); arXiv:1705.03633v1 [cs.CV] May 10, 2017; 13 pgs.

Strumbelj, E. et al., "An Efficient Explanation of Individual Classifications Using Game Theory"; Journal of Machine Learning Research (2010) vol. 11; pp. 1-18.

Lee, G. et al., "Game-Theoretic Interpretability for Temporal Modeling"; arXiv preprint arXiv.1807.00130 (2018); 5 pgs.

Lei, T. et al., "Rationalizing Neural Predictions"; In Proceedings of the 2016 Conference on Empirical Methods in Natural Language Processing (2016); 11 pgs.

Li, J. et al., "Visualizing and Understanding Neural Models in NLP"; In Proceedings of the 2016 Conference of the North American Chapter of the Association for Computational Linguistics: Human Language Technologies pp. 681-691 (2016); arXiv:1506.01066v2 [cs.CL] Jan. 8, 2016; 10 pgs.

Li, J. et al., "Understanding Neural Networks Through Representation Erasure"; arXiv preprint arXiv:1612.08220 (2017); 18 pgs.

Lundberg, S. M. et al., "A Unified Approach to Interpreting Model Predictions"; 31st Conference on Neural Information Processing Systems (NIPS 2017); arXiv:1705.07874v2 [cs.AI] Nov. 25, 2017; 10 pgs.

Nguyen, T. H. et al., "Combining Neural Networks and Log-Linear Models to Improve Relation Extraction"; arXiv preprint arXiv:1511.05926 (2015); 7 pgs.

Ribeiro, M. T., et al., "Why Should I Trust You? Explaining the Predictions of Any Classifier"; In Proceedings of the 22nd ACM SIGKDD International Conference on Knowledge Discovery and Data Mining; ACM (2016); 10 pgs.

Silver, D. et al., "Mastering Chess and Shogi by Self-Play with a General Reinforcement Learning Algorithm"; arXiv preprint arXiv:1712.01815 (2017); 19 pgs.

Simonyan, K. et al., "Deep Inside Convolutional Networks: Visualising Image Classification Models and Saliency Maps"; arXiv preprint arXiv:1312.6034v2 [cs.CV] Apr. 19, 2014; 8 pgs.

Srivastava, N. et al., "Dropout: A Simple Way to Prevent Neural Networks from Overfitting"; The Journal of Machine Learning Research (2014); vol. 15; pp. 1929-1958.

Sundararajan, M. et al., "Axiomatic Attribution for Deep Networks"; In Proceedings of the 34th International Conference on Machine Learning; Sydney, Australia; PMLR 70; Xiv: 1703.01365v2 [cs.LG] Jun. 13, 2017; 11 pgs.

Williams, R. J., "Simple Statistical Gradient-Following Algorithms for Connectionist Reinforcement Learning" Machine Learning (1992); vol. 8; pp. 229-256.

Yala, A. et al., "A Deep Learning Mammography-Based Model for Improved Breast Cancer Risk Prediction" Radiology (2019); 7 pgs.

Yu, M. et al., "Learning Corresponded Rationales for Text Matching"; Under review as a conference paper at ICLR 2019; (2018); 12 pgs.

Zaidan, O. et al., "Using Annotator Rationales to Improve Machine Learning for Text Categorization"; Proceedings of NAACL HLT 2007, Rochester, NY, Apr. 2007; Association for Computational Linguistics (2007); pp. 260-267.

Zhang, Y. et al., "Aspect-Augmented Adversarial Networks for Domain Adaptation"; Transactions of the Association for Computational Linguistics (2017); vol. 5; pp. 515-528.

Zhao, M. et al., "Learning Sleep Stages from Radio Signals: A Conditional Adversarial Architecture"; Proceedings of the 34th International Conference on Machine Learning, Sydney, Australia, PMLR 70; (2017); 10 pgs.

Mullick, S. S. et al., "Generative Adversarial Minority Oversampling"; arXiv:1903.09730v1 [cs.CV] Mar. 22, 2019; 10 pgs.

Chen, H. et al., "Can Rationalization Improve Robustness"; arXiv:2204.11790v2 (2022); 14 pgs.

Sha, L. et al., "Learning from the Best: Rationalizing Prediction by Adversarial Information Calibration"; Association for the Advancement of Artificial Intelligence (2021); 13 pgs.

* cited by examiner

INTROSPECTIVE EXTRACTION AND COMPLEMENT CONTROL

BACKGROUND

Technical Field

The present disclosure generally relates to natural language processing (NLP), and more particularly, to training NLP applications.

Description of the Related Art

In recent years, the rapidly expanding applications of complex neural models also ushered in criteria other than mere performance. For example, various decision applications, such as medical and other high-value classification applications involve some verifying reasons for the predicted outcomes. This area of self-explaining models in the context of NLP applications has primarily evolved along two parallel tracks. On one hand, neural architectures can be designed that expose more intricate mechanisms of reasoning such as module networks. While salient, such approaches may still involve adopting specialized designs and architectural choices that do not yet reach accuracies comparable to Blackbox approaches. On the other hand, limited architectural constraints may be applied in the form of selective rationalization where the goal is to only expose the portion of the text relevant for prediction.

SUMMARY

According to various embodiments, a computing device, a non-transitory computer readable storage medium, and a method are provided for training a natural language processing network. A generator network is operative to receive a corpus of data and select one or more input features from the corpus of data. A first predictor network is operative to receive the one or more selected input features from the generator network and predict a first output label based on the received one or more selected input features. A second predictor network is operative to receive a complement of the selected input features from the generator network and predict a second output label based on the received complement of the selected input features.

In one embodiment, the generator network is configured to play an adversarial game with the second predictor network to make the second predictor network as ineffective to predict an output similar to that of the first predictor network, as possible.

In one embodiment, the generator network is configured to play a minimax game with the second predictor network to make the second predictor network as ineffective to predict an output similar to that of the first predictor network, as possible.

In one embodiment, the complement of the selected input features is based on one or more input features not selected by the generator network for the first predictor network.

In one embodiment, the computer is configured to compare the first output label to the second output label. Upon determining that the first output label is within a predetermined threshold from the second output label, the generator network is adjusted to change a selection of the one or more input features from the corpus of data. Change a selection of the one or more input features from the corpus of data may comprise including input features from the complement of the selected input features from the generator network. The generator network may be iteratively adjusted until the first output label is outside a predetermined second threshold from the second output label.

In one embodiment, the first and second output labels are binary.

In one embodiment, the training is unsupervised.

In one embodiment, the number of input features identified by the generator network is limited based on a computational capability of the computer.

In one embodiment, the generator network is an introspective generator that predicts a label before selecting the one or more input features from the corpus of data. The generator network may have a classifier having an architecture that is similar to that of the first predictor network.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
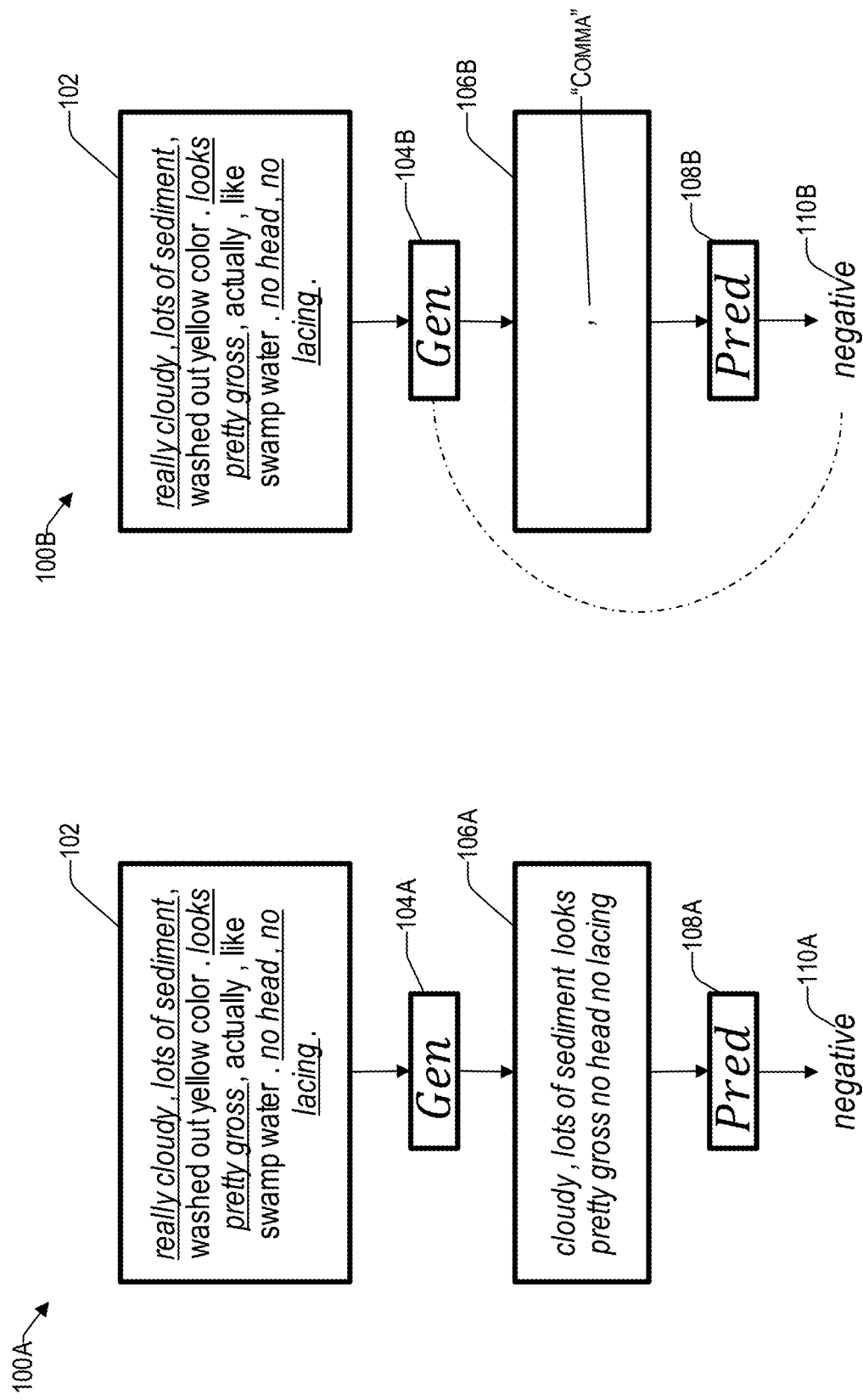
FIG. 1A illustrates a selective rationalization system that includes a corpus of data comprising a plurality of input features.
FIG. 1B illustrates the selective rationalization system of FIG. 1A, where the generator network has a collaborative relationship with a predictor network.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of selective rationalization. In recent years selective rationalization is increasingly used to facilitate that predictive models reveal how they use any available features. The selection may be soft or hard, and identifies a subset of input features relevant for prediction. The setup can be viewed as a cooperate game between the selector (sometimes referred to herein as a rationale generator) and a predictor making use of only the selected features. The co-operative setting may, however, be compromised for two main reasons. First, the generator typically has no direct access to the outcome it aims to justify, resulting in poor performance. Second, there typically is no control exerted on the information left outside the selection.

In one aspect, the teachings herein revise the overall co-operative framework to address these challenges. To that end, an introspective model is introduced that explicitly predicts and includes the outcome into the selection process. In one embodiment, the rationale complement is controlled via an adversary so as not to leave any useful information out of the selection. The teachings herein demonstrate that the two complementary mechanisms maintain both high predictive accuracy and lead to comprehensive rationales. In this way, the machine learning model is made more introspective and computationally accurate.

In one aspect, the selection process discussed herein can be described as a cooperative game between a generator and a predictor operating on a selected, partial input text. The two players aim for the shared goal of achieving high predictive accuracy, operating within the confines imposed by rationale selection (e.g., a small, concise portion of input text). In one embodiment, the rationales are learned in an unsupervised manner, without guidance other than their size and form.

An example of ground-truth and learned rationales are given in Table 1 below:

TABLE 1

Label: negative
Original Text: really cloudy, lots of sediment, washed out yellow color. looks pretty gross, actually, like swamp water. no head, no lacing.
Rationale from first example model:
["really cloudy lots", "yellow", "no", "no"]
Rationale from cooperative introspection model: [". looks", "no", "no"]
Rationale from Introspective model:
["cloudy", "lots", "pretty gross", "no lacing"]

By way of example only and not by way of limitation, Table 1 above provides the rationales extracted by different models on the sentiment analysis of beer reviews. A motivation for the teachings herein arises from the potential failures of cooperative selection. Since a generator typically has no direct access to the outcome it aims to justify, the learning process may converge to a poorly performing solution. Moreover, since only the selected portion is evaluated for its information value (via a predictor), there is typically no explicit control over the remaining portion of the text left outside the rationale. These two challenges are complementary and should be addressed jointly.

The clues in text classification tasks are typically short phrases. However, diverse textual inputs offer a plethora of such clues that may be difficult to disentangle in a way that generalizes to evaluation data. Indeed, the generator may fail to disentangle the information about the correct label, offering misleading rationales instead. Moreover, as discussed in more detail below, the collaborative nature of the interaction between a generator network and a predictor network, sometimes referred to herein as a "game," may enable the players to select a sub-optimal communication code that does not generalize, but overfits the training data. This concept is discussed in more detail in the context of the discussion of FIG. 1B below.

In one aspect, the teachings herein address these concerns by an introspective rationale generator. The idea includes to force the generator to explicitly understand what to generate rationales for. More specifically, the output label of a selective rationalization system is predicted with the a more complete selection of the input features of a corpus of input data, thereby ensuring better overall performance. These concepts will be better understood in view of the architectures described below.

Example Architectures

Reference now is made to FIGS. 1A and 1B, which illustrate a selective rationalization system 100A that includes a corpus of data 102 comprising a plurality of input features. In one embodiment the corpus of data 102 may be in natural language. The system 100A includes two players, a generator 104A and a prediction network 108A. The generator 104A is operative to receive the corpus of data 102 and extract therefrom what it deems to be relevant input features that are salient in determining an output label 110A. Stated differently, the generator 104A is operative to select a subset of input features 106A that is predictive of an output label 110A that characterizes (e.g., classifies) the corpus of data 102. In the example of FIG. 1A, the relevant features are underlined. The actually selected sub features 106A are used by the predictor 108A to predict an appropriate classification 110A, sometimes referred to herein as an output label. In the example of FIG. 1A the selected subset of input features 106A is used by the system 100A to perform sentiment analysis on the corpus of data 102 such that an appropriate classification thereof is achieved, represented by output label 110A. The output label 110A is a prediction, such as a classification. In various embodiments, the classification may be binary (positive/negative; yes/no; etc.,) or any other type of classification into a predetermined set of classes. In the present example, based on the subset of input features selected, the conclusion of the predictor 108A is that the corpus of data 102 has a "negative" sentiment of the wine captured in the corpus of data 102.

It should be noted that the natural language processing of FIG. 1A is provided by way of example only and not by way of limitation. Indeed, different types of corpus of data 102, such as key performance indicators (KPIs) of a networked system, medical information, as well as other systems, are contemplated by the teachings herein as well.

The selective rationalization system 100A of FIG. 1A is operative to select a subset of input features 106A that is most predictive of the output label 110A. The problem is that such selective rationalization systems 100A may suffer from degeneration, where the appropriate subset of input features is not selected, which may not be readily evident if a correct result is achieved, because neural networks are often treated as a "Black-box." Accordingly, degeneration involves the generator 104A collaborating with the prediction network 108A to guess an output label 110A and develop its own code to communicate with the predictor network (e.g., comma, period, etc.). In this regard FIG. 1B illustrates a scenario where the generator 104B incorrectly selects a comma as a subset of input features 106B, which is used by the predictor 108B to identify a classification 110B. Although a correct classification is achieved of the corpus of data 102, the quality of the analysis is not optimal because it is not based on a valid subset of input features 106B.

Accordingly, the cooperative game system 100B of FIG. 1B has two players: (i) a generator 104B and (ii) a predictor 108B. It does not explicitly control the information left out of the rationale 106B. As a result, it is possible for the rationales to degenerate as including only select words without the appropriate context. With access to the predicted label as input, the generator 104B and the predictor 104B can find a communication scheme by encoding the predicted label with special word patterns (e.g., highlight "." for positive examples and "," negative ones). Stated differently, the generator 104B is in collaboration with the predictor 108B to provide a predicted output label 110B. Table 1 shows such cases for the two cooperative methods, where degeneration has occurred.

In this regard, reference is made to FIGS. 2A and 2B, which illustrates an enhanced architecture 200B that includes an additional player with respect to the selective rationalization system 200A of FIG. 2A. Accordingly, while the selective rationalization system 200A includes a generator network 204A and a collaborative predictor network 208B, the architecture 200B, in addition to a first predictor network 208B there is a second predictor network 218, referred to herein as a complementary predictor network 218. In contrast to FIG. 2A, which is a two-player system, architecture 200B is a three-player system. The first predictor network 208B receives subset of input features r selected by the generator network 204A and predicts an output label y based on r. In contrast, the complementary predictor network 218 selects a subset of input features x that are different from those of r. Stated mathematically, the input to the complementary predictor network 218 is provided by the following expression:

$$r^c = x \text{ with } r \text{ removed} \qquad (Eq. 1)$$

By virtue of using the three-player game depicted in FIG. 2B for rationalization, explicit control is rendered over also the unselected input features $r^c$. The added third adversarial player, namely the complementary predictor network 218, sometimes referred to herein as the discriminator, is able to guide the cooperative communication between the generator network 204A and the first predictor network 208B. The goal of the discriminator 218 is to attempt to predict the correct label using only words left out of the rationale. During training, the generator aims to fool the discriminator while still maintaining high accuracy for the predictor. This ensures that the selected rationale includes substantially all/most of the input features salient to the target label y, leaving out irrelevant input features. In one embodiment, the number of input features identified by the generator network is limited to accommodate the computational capability of a computing device performing the calculations. For example, to improve computational speed, the number of input features selected may be confined to a predetermined number, based on the computational capability of the computing device performing the calculations. In some embodiments, one or more computing platforms performing the three-player selective rationalization system discussed herein may be implemented by virtual computing devices in the form of virtual machines or software containers that are hosted in the cloud, thereby providing an elastic architecture for processing and storage. In this way, the number of input features identified by the generator is expanded or even removed.

The equilibrium of the three-player architecture 200B provides improved properties for the extracted rationales. Moreover, the three-player framework facilitates cooperative games such to improve both predictive accuracy and rationale quality. In one aspect, by combining the two approaches of an introspective generator and a three-player architecture, high predictive accuracy is achieved by the computing device, as well as non-degenerate rationales.

Figure 3:
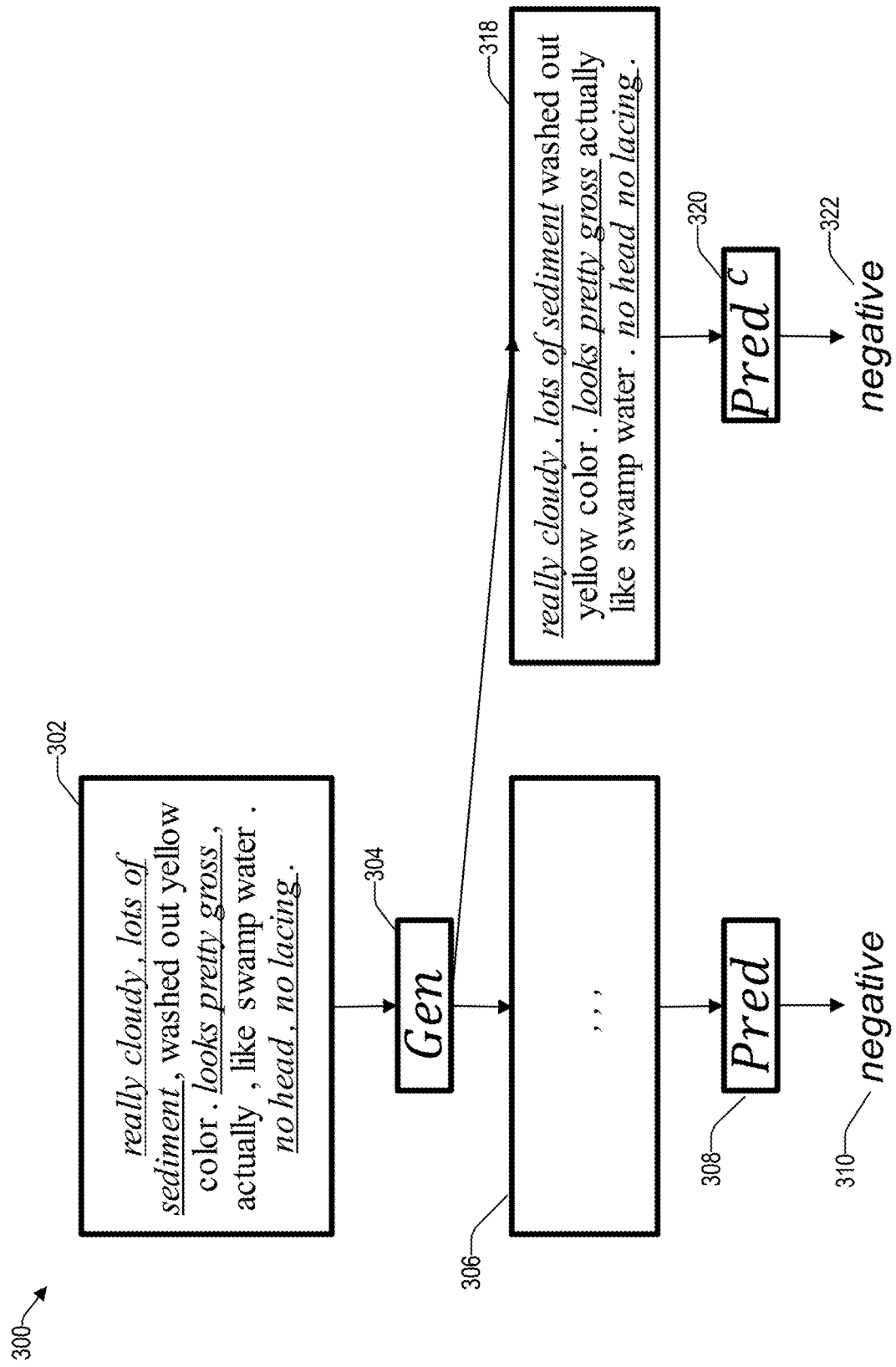
FIG. 3 is a block diagram of a selective rationalization system having a three-player model, consistent with an illustrative embodiment.

Reference now is made to FIG. 3, which illustrates a selective rationalization system 300 having a three-player model, consistent with an exemplary embodiment. System 300 can be used as an example to better explain how the three-player model operates in improving the quality of the selection of the generator network 304. The generator network 304 receives the corpus of data 302 and predicts the output label 310. By way of efficiency, it selects input features 306 (e.g., commas in the present example, which may be found in most communications). For example, these commas communicate to the predictor network 308 what the output label 310 should be. In another scenario, the generator 304 may select one or more periods as input features to communicate to the predictor network 308 that the output label 310 should be "positive" instead. Thus, instead of selecting meaningful input features, the generator network 304 simply colludes or collaborates with the predictor network 306 to advance a predicted output label 310.

The complementary predictor network 320 uses unselected input features 318 from the corpus of data 302 and comes to the same "correct" prediction, represented by output label 322. Thus, the unselected words 318 are sufficient for the complementary predictor 320 to achieve the same result as the first output label 310. The fact that the first output label and the second output label are substantially similar indicates that additional input features from the corpus of data 302 should be selected by the generator network 304 for the first predictor network 308. Ideally, the output label of the complementary predictor network 322 should be as opposite to the output label of the first predictor network 310 as possible. Thus, the "worse" the prediction of the complementary predictor network 320, the more accurate the generator network 304. In some scenarios, the output of the complementary predictor network 318 may be ambiguous or inconclusive, thereby indicating that it has not extracted any meaningful input features from the corpus of data 302. That is because all the meaningful features have been selected by the generator network 304.

In one embodiment, the iterative process ends when all meaningful information is selected by the generator and the complementary predictor provides a result having a confidence level that is below a predetermined threshold (e.g., F rating on a scale of A to F). In this way, the accuracy of the generator is improved and collaboration with the first predictor network 308 suppressed.

Mathematical Explanations

With the foregoing explanation of the three-player architecture, it may be helpful to further expound on the issue of rationalization. The following notations are used to facilitate the present discussion. Bolded upper-cased letters, e.g., X, denote random vectors; non-bolded upper-cased letters, e.g., X, denote random scalar variables; bolded lowercased letters, e.g., x, denote deterministic vectors or vector functions; non-bolded lower-cased letters, e.g., x, denote deterministic scalars or scalar functions. The expression $p_x(\cdot | Y)$ denotes conditional probability density/mass function conditional on Y. The expression $H(\cdot)$ denotes Shannon entropy. The expression $E[\cdot]$ denotes expectation.

By way of example only, and not by way of limitation, the target application here is text classification on data tokens in the form of $\{(X, Y)\}$. The expression $X=X_{1:L}$ is denoted as a sequence of words in an input text with length L. The expression Y is denoted as a label. The goal is to generate a rationale, denoted as $r(X)=r_{1:L}(X)$, which is a selection of words in X that accounts for Y. Formally, $r(X)$ is a hard-masked version of X that takes the following form at each position i:

$$r_i(X)=z_i(X) \cdot X_i, \quad \text{(Eq. 2)}$$

Where, $z_i \in \{0, 1\}^N$ is a binary mask.

We further define the complement of rationale, denoted as $r^c(X)$, as follows:

$$r_i^c(X)=(1-z_i(X)) \cdot X_i. \quad \text{(Eq. 3)}$$

For notational ease, we define:

$$R=r(X),\ R^c=r^c(X),\ Z=z(X). \quad \text{(Eq. 4)}$$

An ideal rationale should satisfy various conditions. The subset of input features selected by the generator network 204A R is sufficient to predict Y, as provided by the expression below:

$$p_Y(\cdot | R)=p_Y(\cdot | X). \quad \text{(Eq. 5)}$$

The term $R^c$ representing the unselected features of the generator network 204A, does not include sufficient information to predict Y, as provided by the expression below:

$$H(Y|R^c) \geq H(Y|R)+h, \quad \text{(Eq. 6)}$$

Where h is a constant.

The segments in X that are included in R should be sparse and consecutive, as provided by the expression below:

$$\sum_i Z_i \leq s,\ \sum_i |Z_i - Z_{i-1}| \leq c, \quad \text{(Eq. 7)}$$

Where s and c are constants.

In one embodiment, the sufficiency condition of equation 5 above is the core one of a legitimate rationale, which essentially stipulates that the rationale includes all the relevant information in X to predict Y. The compactness condition of equation 7 above stipulates that the rationale should be continuous and should not include more words than necessary. For example, without the compactness condition, a trivial solution to equation 5 above would be X itself. The first inequality in equation 7 includes the sparsity of rationale, and the second one includes the continuity. The comprehensiveness condition of equation 6 is discussed in more detail later.

There are two justifications of the comprehensiveness condition. First, it regulates the information outside the rationale, so that the rationale includes all the relevant and useful information, hence the name comprehensiveness. Second, the failure case of degeneration can only be prevented by the comprehensiveness condition. As mentioned previously, degeneration refers to the situation where, rather than finding words (i.e., input features) in the input corpus of data X that explains the output label Y, the generator 204A R attempts to encode the probability of Y using trivial information, e.g. punctuation and position. Consider the following toy example of binary classification ($Y \in \{0, 1\}$), where X can always perfectly predict the output label Y. The following rationale satisfies the sufficiency and compactness: R includes the first word of X when Y=1, and the last word when Y=1. This subset of input features selected by the generator network R is sufficient to predict Y, and thus satisfies the sufficiency condition. Apparently, this R is compact (only one word). However, this rationale does not provide a valid explanation as to the reasoning why the output label Y is selected.

Theoretically, any previous cooperative framework may suffer from the above problem, if the generator has the potential to accurately guess Y with sufficient accuracy. This problem occurs because there is no control of the input features unselected by R. In the presence of degeneration, some key predictors in X will be left unselected by R. Thus, by looking at the predicting power of $R^c$, architecture 200B can determine if degeneration occurs. Specifically, when degeneration is present, a substantial portion of the input features are left unselected by R. Accordingly, $H(Y|R^c)$ is low. That is why the lower bound in equation 6 rules out the degeneration cases.

The selective rationalization system 300 includes three players: (i) a rationale generator, sometimes referred to herein as generator network 304, which generates the rationale R (represented by block 306) and its complement $R^c$ (represented by block 318) from a corpus of data (e.g., text) 302; (ii) a predictor network that predicts the probability of Y based on R, a complementary predictor 320 that predicts the probability of Y based on $R^c$.

Figures 4A, 4B:
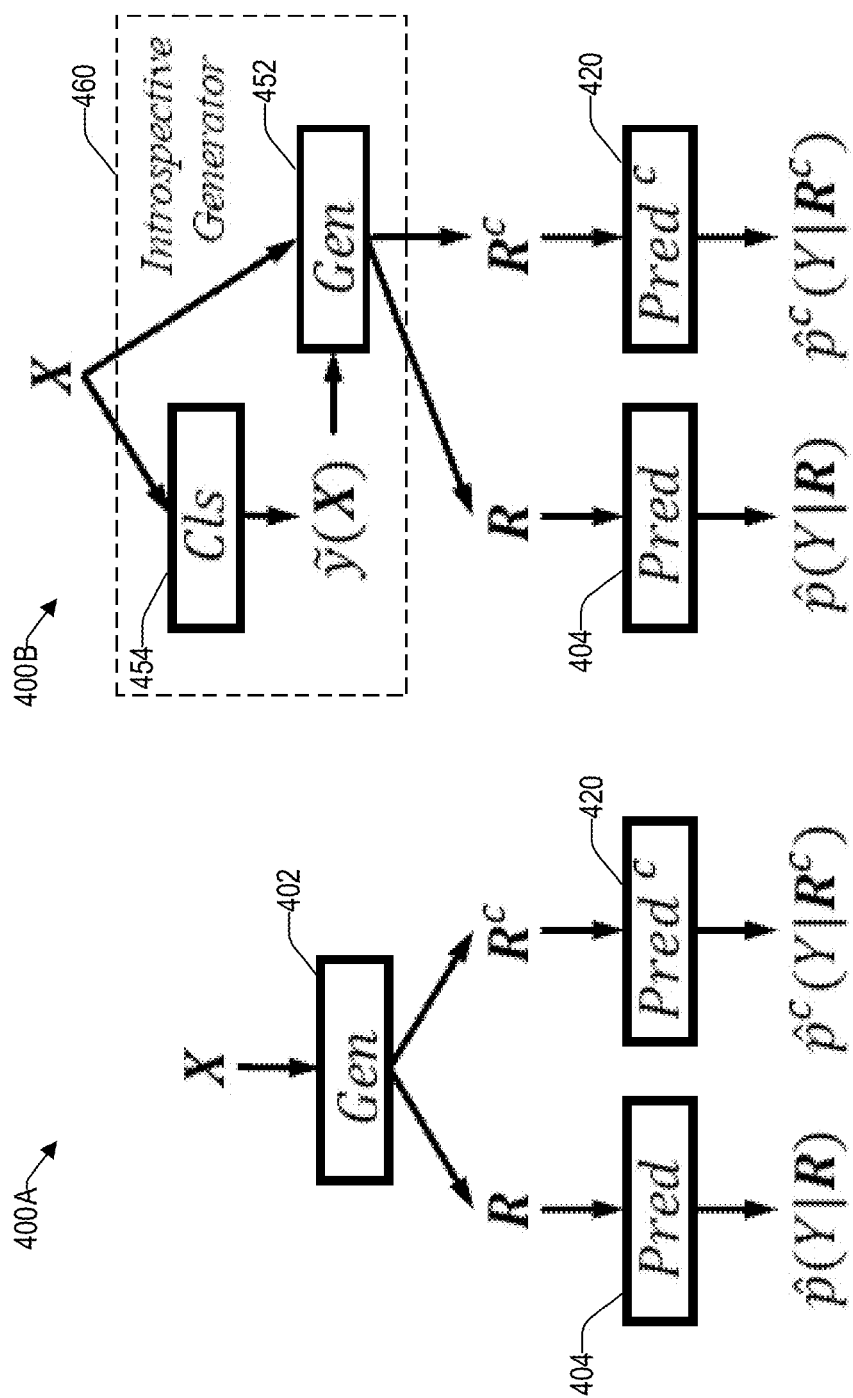
FIG. 4A illustrates a three-player model, consistent with an illustrative embodiment.
FIG. 4B is a block diagram of a three-player model having an introspective generator, consistent with an illustrative embodiment.

FIG. 4A illustrates a three-player model 400A, consistent with an illustrative embodiment. The three-player model 400A introduces an additional complementary predictor 420 that uses reinforcement learning between the generator network 402 and the complementary predictor network 420, in addition to the cooperative game between the generator network 402 and the predictor network 404. For example, reinforcement learning discussed herein may use machine learning to determine which input features of the input corpus of data X to select to provide to the predictor network, and which complementary input features to select to provide to the complementary predictor network 420, such that the prediction of the complementary predictor is as bad (e.g., inaccurate) as possible, thereby improving the quality of the selection of the generator network 402. In one embodiment, a minimax algorithm is used between the generator network 402 and the complementary predictor network 420. The iterative process continues until the prediction of the complementary predictor, is as inaccurate as possible or the number of input features selected by the generator network reaches a predetermined threshold.

For example, the predictor network 404 estimates a probability of Y conditioned on R, denoted as $\hat{p}(Y|R)$. The complementary predictor estimates probability of Y conditioned on $R^c$, denoted as $\hat{p}^c(Y|R)$. In one embodiment both predictors are trained using the cross-entropy loss, provided by the expressions below:

$$\mathcal{L}_p = \min_{\hat{p}(\cdot,\cdot)} -H(p(Y|R); \hat{p}(Y|R)) \quad \text{(Eq. 8)}$$

$$\mathcal{L}_c = \min_{\hat{p}^c(\cdot,\cdot)} -H(p(Y|R^c); \hat{p}^c(Y|R^c))$$

Where,

H(p;q) denotes the cross entropy between p and q; and $p(\cdot|\cdot)$ denotes the empirical distribution.

It is worth emphasizing that $\mathcal{L}_p$ and $\mathcal{L}_c$ are both functions of the generator network.

The generator network 402 extracts R and $R^c$ by generating the rationale mask, $z(\cdot)$, as shown above in equations 2-3. More specifically, z(·) is determined by minimizing the weighted combination of four losses:

$$\min_{z(\cdot)} \mathcal{L}_p + \lambda_g \mathcal{L}_g + \lambda_s \mathcal{L}_s + \lambda_c \mathcal{L}_c, \quad (\text{Eq. 9})$$

Where $L_g$ encourages the gap between $L_p$ and $L_c$ to be large, as provided by the expression below.

$$L_g = \max\{L_p - L_c + h, 0\}. \quad (\text{Eq. 10})$$

Equation 10 above stipulates the comprehensiveness property of the rationale (Eq. 6). If the complement rationale is less informative of Y than the rationale, then $L_c$ should be larger than $L_p$.

The terms $L_s$ and $L_c$ impose the sparsity and continuity respectively, which correspond to equation 7:

$$\mathcal{L}_s = \max\left\{\sum_i Z_i - s, 0\right\}, \mathcal{L}_c = \sum_i \|Z_i - Z_{i-1}\| - c. \quad (\text{Eq. 11})$$

Equation 8 above indicates that the generator network 402 plays a cooperative game with the predictor network 404, because both try to maximize the predictive performance of R. On the other hand, the generator network 402 plays an adversarial game with the complementary predictor network 420, because the latter tries to maximize the predictive performance of $R_c$, but the former tries to reduce it.

In one embodiment, during training of the generator network 402, the three players perform gradient descent steps with respect to their own losses. For the generator network 402, since z(X) is a set of binary variables, the regular gradient descent algorithm is not applied. Instead a policy gradient is used to optimize the models. We maximize the reward that is defined as the negative loss in equation 9. In order to have bounded rewards for training stability, the negative losses Lp and Lc are replaced with accuracy.

Reference now is made to FIG. 4B, which is a block diagram of a three-player model 400B having an introspective generator, consistent with an illustrative embodiment. The introspective generator 460 includes a generator network 452 that explicitly predicts a label 460 before making rationale selections (e.g., R and $R^c$). The improved generator 460 still fits into the basic three-player framework discussed in the context of FIG. 4A. The main difference being how the generator generates the mask z(X), which now breaks down into two steps. First, the generator network 452 uses a regular classifier 454 that takes the input X and predicts the label, denoted ỹ(X). In one embodiment, classification tasks, the maximum likelihood estimate is used, as provided by equation 12 below:

$$\tilde{y}(X) = \operatorname*{argmax}_y \tilde{p}(Y = y \mid X) \quad (\text{Eq. 12})$$

Where $\tilde{p}(Y=y|X)$ is the predicted probability by maximizing the cross entropy, which is pre-trained.

Second, a label-aware rationale generator generates the binary mask of the rationales, as provided by equation 13 below:

$$z(X) = \tilde{z}(X, \tilde{y}(X)) \quad (\text{Eq. 13})$$

Note that ỹ is a function of X, so the introspective generator 460 is essentially a function of X.

In one embodiment, the classifier 454 can use the same architecture as that of the predictor network 404 and the complementary predictor network 420.

In one aspect, working in a cooperative game, the introspection generator 460 may make the degeneration problem more severe: when the classifier $\tilde{p}(\cdot|X)$ becomes sufficiently accurate during training, the generator network 452 only needs to encode the information of ỹ into R. Therefore, the three-player game architecture of FIG. 4B, while helping any existing generator-predictor framework on its own, is particularly useful for the introspective model of FIG. 4B.

In one embodiment, for both the generators and the two predictors in FIGS. 4A and 4B, bidirectional Long short-term memory (LSTM) are used with hidden dimension 400. For example, in the introspection generator 460, the classifier 454 comprises the same bidirectional LSTM, and z(X, ỹ) is implemented as an LSTM sequential labeler with the label ỹ transformed to an embedding vector that serves as the initial hidden states of the LSTM. For the relation classification task, since the model is aware of the two target entities, the relative position features are added. The relative position features are mapped to learnable embedding vectors and concatenated with word embeddings as the inputs to the LSTM encoder of each player. All hyperparameters are tuned on the development sets according to predictive accuracy. Stated differently, all the models are tuned without seeing any rationale annotations.

Class-Wise Adversarial Classification

Selection of input features such as relevant pieces of text can be used to highlight how complex neural predictors operate. The selection can be optimized post-hoc for trained models or included directly into the method itself. However, an overall selection of input features may not properly capture the multi-faceted nature of useful rationales such as pros and cons for decisions. To this end, in one embodiment, the teachings herein provide a game theoretic approach to class-dependent rationalization, where the computing device performing the algorithm is specifically trained to highlight evidence supporting alternative conclusions.

Each class involves three players set up competitively to find evidence for factual and counter-factual scenarios. What is discussed below is how the game drives a solution towards meaningful class-dependent rationales. The method is evaluated in single and multi-aspect sentiment classification tasks. The architecture discussed in the context of the present embodiment is able to identify both factual (justifying the ground truth label) and counterfactual (countering the ground truth label) rationales. In this way, meaningful insight as to the rationales behind the output label is provided.

Interpretability is rapidly rising alongside performance as a key operational characteristic across natural language processing (NLP) and other applications. One way of highlighting how a complex system operates is by selecting input features relevant for the prediction. If the selected subset is short and concise (for text), it can potentially be understood and verified against domain knowledge. The selection of features can be optimized to explain already trained models, included directly into the method itself as in self-explaining models, or optimized to mimic available human rationales.

In one aspect, what is discussed herein is how rationales are defined and estimated. The common paradigm to date is to make an overall selection of a feature subset that maximally explains the target output/decision. For example, maximum mutual information criterion chooses an overall subset of features such that the mutual information between the feature subset and the target output decision is maximized, or, equivalently, the entropy of the target output decision conditional on this subset is minimized. Rationales can be multi-faceted, however, involving support for different outcomes, just with different degrees. For example, the overall sentiment associated with a product could be understood in terms of weighing associated pros and cons included in the review. Existing rationalization techniques strive for a single overall selection, therefore lumping together the facets supporting different outcomes.

The class-wise rationales approach discussed herein, which is based on multiple sets of rationales that respectively explain support for different output classes (or decisions). Unlike conventional rationalization schemes, class-wise rationalization takes a candidate outcome as input, which can be different from the ground-truth class labels, and uncovers rationales specifically for the given class. To find such rationales, what is provided herein is a game theoretic algorithm, called Class-wise Adversarial Rationalization ($C_{AR}$). $C_{AR}$ comprises three types of players: (i) a factual rationale generator, which generates rationales that are consistent with the actual label, (ii) a counterfactual rationale generator, which generates rationales that counter the actual label, and (iii) a discriminator, which discriminates between factual and counterfactual rationales. Both factual and counterfactual rationale generators try to competitively "convince" the discriminator network that they are factual, resulting in an adversarial game between the counterfactual generators and the other two types of players. The discussion below explains how the $C_{AR}$ game drives towards meaningful class-wise rationalization, under an information-theoretic metric, which is a class-wise generalization of the maximum mutual information criterion. Moreover, Applicants have identified under empirical evaluation on both single and multi-aspect sentiment classification that $C_{AR}$ can successfully find class-wise rationales that align well with human understanding.

With the foregoing overview of CAR, it may be helpful to discuss the notations used below. Upper-cased letters, e.g. X or X, denote random variables or random vectors respectively; lower-cased letters, e.g. x or x, denote deterministic scalars or vectors respectively; script letters, e.g. $\mathcal{X}$, denote sets. $p_{X|Y}(x|y)$ denotes the probability of X=x conditional on Y=y. E[X] denotes expectation.

In one embodiment, the class-wise rationalization problem can be formulated as follows. For any input X, which is a random vector representing a string of text, the goal is to derive a class-wise rationale Z(t) for any t∈y such that Z(t) provides evidence supporting class t. Each rationale can be understood as a masked version X, i.e. X with a subset of its words masked away by a special value (e.g., 0). In one embodiment, class-wise rationales are defined for every class t∈y. For t=y (the correct class) the corresponding rationale is called factual; as to t≠y, they are referred to herein as counterfactual rationales. For simplicity and to facilitate the present explanation, the discussion herein will focus on two-class classification problems (y={0, 1}).

CAR can uncover class-wise rationales using adversarial learning, inspired by outlining pros and cons for decisions. In one embodiment, there are two factual rationale generators, provided by the expression below:

$$g_t^f(X), t \in \{0,1\} \quad \text{(Eq. 14)}$$

The two functional generators generate rationales that justify class t when the actual label agrees with t, and two counterfactual rationale generators, provided by the expression below:

$$g_t^c(X), t \in \{0,1\} \quad \text{(Eq. 15)}$$

The two counterfactual rationale generators generate rationales for the label other than the ground truth. Further, two discriminators $d_t(Z)$, ∈ {0,1} are introduced, which aim to discriminate between factual and counterfactual rationales, i.e., between $g_t^f(X)$ and $g_t^c(X)$. Accordingly, we have six players, divided into two groups. The first group pertains to t=0 and involves $g_0^f(X)$, $g_0^c(X)$, and $d_o(Z)$ as players. Both groups play a similar adversarial game, so we focus the discussion on the first group and will not repeat for the second group, for brevity.

Figure 5:
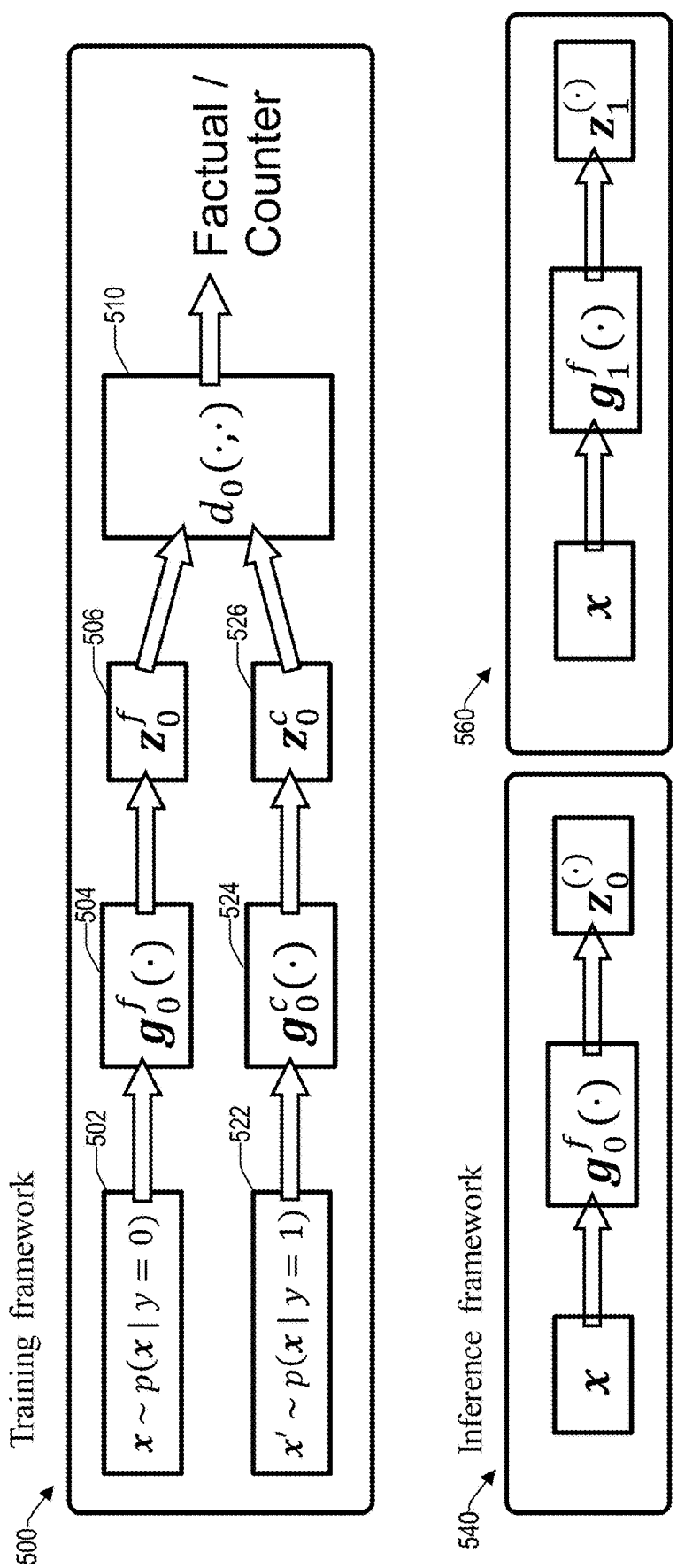
FIG. 5 illustrates a block diagram of a training framework and an inference framework, consistent with an illustrative embodiment.

FIG. 5 illustrates a block diagram of a training framework 500 and an inference framework 540 and 560 during inference, consistent with an illustrative embodiment. The training framework 500 includes a corpus of data 502 from which a factual generator 504 selects a subset of input features in support of its rationale of an output (e.g., sentiment). The subset of input features selected by the generator network 506 are provided to a discriminator network 410. Similarly, the counterfactual generator 524 selects a subset of input features 522 in support of its rationale of a complementary output, represented by block 526. Both sets of rationales are presented to a discriminator network 510, operative to discern which position prevails. In some embodiments, the discriminator is operative to provide a mixed result. For example, instead of merely providing a binary output (e.g., positive or negative), the discriminator network 510 may provide a more nuanced rating, such as alpha-numeric (e.g., 0 to 10, A to F), descriptive (e.g., none, low, medium, and high), based on color (e.g., red, green, and yellow), or any other suitable rating scale. For example, the rating of a hotel may be evaluated as 3/5 stars based on the factual rationale 506 in view of the counterfactual rationale 526.

In the adversarial game of the training framework 500, the discriminator network $d_0(\cdot)$ represented by block 510, takes a rationale Z generated by either $g_0^f(\cdot)$ or $g_0^c(\cdot)$ as input, and outputs the probability that Z is generated by the factual generator $g_0^f(\cdot)$. In one embodiment, the training target for $d_0(\cdot)$ is based on a generative adversarial network (GAN), provided by the expression below:

$$d_0(\cdot) = \underset{d(\cdot)}{\operatorname{argmin}} - p_Y(0)\mathbb{E}[\log d(g_0^f(X)) \mid Y = 0] - \quad \text{(Eq. 16)}$$
$$p_Y(1)\mathbb{E}[\log(1 - d(g_0^c(X))) \mid Y = 1]$$

The factual generator $g_0^f(\cdot)$ of block 504 is trained to generate rationales from text labeled Y=0. In contrast, the counterfactual generator $g_0^c(\cdot)$ of block 524, learns from text labeled Y=1. Both generators 504 and 524 try to convince the discriminator network 510 that they are factual generators for Y=0, as provided by the expression below:

$$g_0^f(\cdot) = \underset{g(\cdot)}{\operatorname{argmax}} \mathbb{E}[h_0(d_0(g(X))) \mid Y = 0], \quad \text{(Eq. 17)}$$
$$\text{and } g_0^c(\cdot) = \underset{g(\cdot)}{\operatorname{argmax}} \mathbb{E}[h_1(d_0(g(X))) \mid Y = 1],$$
$$\text{s.t. } \mathbb{E}[\omega_0(g_0^f(X)) \mid Y = 0] \leq 0, \mathbb{E}[\omega_1(g_0^c(X)) \mid Y = 1] \leq 0,$$

Where,
$\omega_0(\cdot)$ and $\omega_1(\cdot)$ represent multiple regularization constraints such as sparsity and continuity, and
$h_0(\cdot)$ and $h_1(\cdot)$ are both monotonically-increasing functions that satisfy the following properties:

$xh_0\left(\dfrac{x}{x+a}\right)$ is convex in $x$, (Eq. 18)

and $xh_1\left(\dfrac{a}{x+a}\right)$ is concave in $x$, $\forall\, x, a \in [0, 1]$ |

One valid choice is $h_0(x)=\log(x)$ and $h_1(x)=-\log(1-x)$, which reduces the problem to a GAN-style problem.

FIG. 5 summarizes the training procedure of these three players. As illustrated in the training framework 500, the counter factual generator 524 ($g^c(\cdot)$) plays a game with both $d_0(\cdot)$ and $g_0^f(\cdot)$, because it tries to trick the discriminator network 510 ($d_0(\cdot)$) into misclassifying its output as factual, whereas $g_0^f(\cdot)$ helps $d_0(\cdot)$ make the correct decision, as illustrated by inference framework 540. The other group of players, $g_1^f(\cdot)$, $g_1^c(\cdot)$ and $d_1(\cdot)$, play a similar game. The main difference is that now the factual generator operates on text with label Y=1, and the counterfactual generator on text with label Y=0.

Example Scenario

Consider a simple bag-of-word scenario, where the input text is regarded as a collection of words drawn from a vocabulary of size N. In this scenario, X can be formulated as an N-dimensional binary vector. $X_i=1$, if the i-th word is present, and $X_i=0$ otherwise. The expression $p_{X|Y}(x|y)$ represents the probability distribution of X in natural text conditional on different classes Y=y.

The rationales $Z_0^f$ and $Z_0^c$ are also multivariate binary vectors. $Z_{0,i}^f=1$ if the i-th word is selected as part of the factual rationale, and $Z_{0,i}^f=0$ otherwise. The expression $p_{z_0^f|Y}(z|0)$ denotes the induced distribution of the factual rationales, which is well-defined in the factual case (Y=0). This distribution is determined by how $g_0^f(\cdot)$ generates the rationales across examples. In the optimization problem, we will primarily make use of the induced distribution, and similarly for the counterfactual rationales.

To simplify the present discussion, it is assumed that the dimensions of X are independent conditional on Y. Furthermore, we assume that the rationale selection scheme selects each word independently, so the induced distributions over $Z_0^f$ and $Z_0^c$ are also independent across dimensions, conditional on Y.

$$\forall\, x, z \in \{0,1\}^N,\ \forall\, y \in \{0,1\},$$ (Eq. 19)

$$p_{X|Y}(x\mid y) = \prod_{i=1}^{N} p_{X|Y}(x_i\mid y),\ p_{Z_0^f|Y}(z\mid y) = \prod_{i=1}^{N} p_{Z_{0,i}^f|Y}(z_i\mid y),$$ (Eq. 20)

$$p_{Z_0^c|Y}(z\mid y) = \prod_{i=1}^{N} p_{Z_0^c|Y}(z_i\mid y)\mid$$

Figure 2:
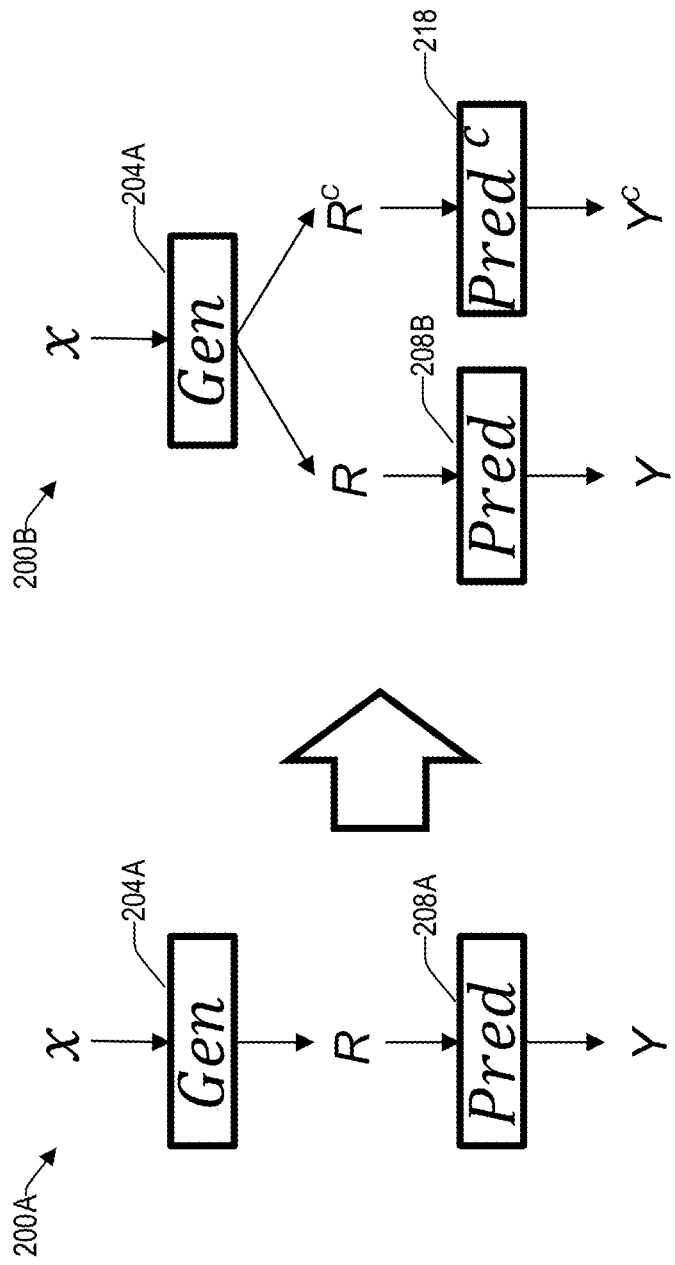
FIG. 2A illustrates an architecture of a two-player system.
FIG. 2B is an architecture of a three-player system, consistent with an illustrative embodiment.
Figure 6:
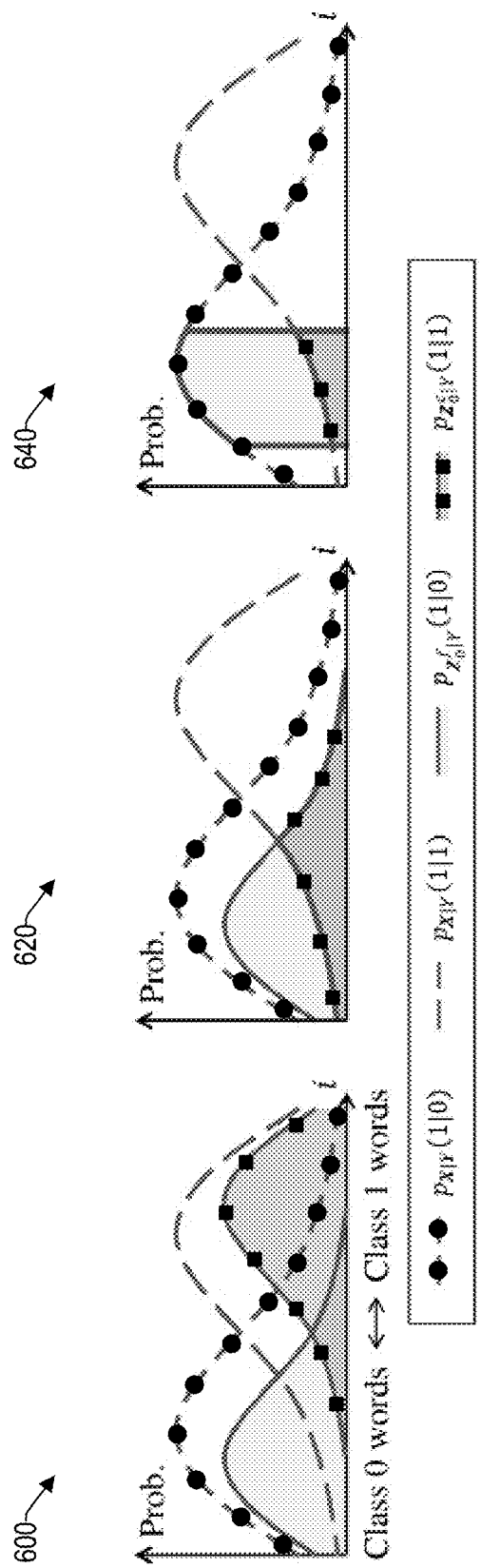
FIG. 6 illustrates how Class-wise Adversarial Rationalization (CAR) works in a bag of word scenario, consistent with an illustrative embodiment.

Reference now is made to FIG. 6, which illustrates how CAR works in a bag of word scenario, consistent with an illustrative embodiment. Plot 600 of FIG. 2 illustrates $p_{X_i|Y}(1|0)$ and $p_{X_i|Y}(1|1)$ as functions of i (the horizontal axis corresponds to sorted word identities). These two curves represent the occurrence of each word in the two classes. In FIG. 6, the words to the left satisfy $p_{X_i|Y}(1|0) > p_{X_i|Y}(1|1)$, i.e. they occur more often in class 0 than in class 1. These words are most indicative of class 0, which we will call class-0 words. Similarly, the words to the right are called class-1 words.)

Plot 600 of FIG. 6 also illustrates an example of $p_{z_{0,i}^f|Y}(1|0)$ and $p_{z_{0,i}^c|Y}(1|1)$ which represents the occurrence of each word in the factual and counterfactual rationales respectively.

Note that these two curves should satisfy the following constraints:

$$p_{z_{0,i}^f|Y}^{(1|0)} \leq p_{X_i|Y}^{(1|0)}.$$

and $$p_{z_{0,i}^c|Y}^{(1|1)} \leq p_{X_i|Y}^{(1|1)}.$$ (Eq. 21)

This is because a word can be chosen as a rationale only if it appears in a text, and this strict relation translates into an inequality constraint in terms of the induced distributions. As shown in plot 600 of FIG. 6, the $p_{z_{0,i}^f|Y}(1|0)$ and $p_{z_{0,i}^c|Y}(1|1)$ curves are below the $p_{X_i|Y}(1|0)$ and $p_{X_i|Y}(1|0)$ curves respectively. For the remainder of this section, we will refer to $p_{X_i|Y}(1|0)$ as the factual upper-bound, and $p_{X_i|Y}(1|1)$ as the counterfactual upper-bound. What is demonstrated herein is that the optimal strategy for both rationale generators in this adversarial game is to choose the class-0 words.

We will first find out what is the optimal strategy for the counterfactual generator, or, equivalently, the optimal $p_{z_{0,i}^c|Y}(1|1)$ curve, given an arbitrary $p_{z_{0,i}^f|Y}(1|1)$ curve. The goal of the counterfactual generator is to fool the discriminator. Therefore, its optimal strategy is to match the counterfactual rationale distribution with the factual rationale distribution. As shown in plot 620 of FIG. 2, the $p_{z_{0,i}^c|Y}(1|1)$ curve tries to overlay with the $p_{z_{0,i}^f|Y}(1|1)$ curve, within the limits of the counterfactual upper bound constraint.

The goal of the factual generator is to help the discriminator. Therefore, its optimal strategy, given the optimized counterfactual generator, is to "steer" the factual rationale distribution away from the counterfactual rationale distribution. Recall that the counterfactual rationale distribution tries to match the factual rationale distribution, unless its upper-bound is binding. The factual generator will therefore choose the words whose factual upper-bound is higher than the counterfactual upper-bound. These words are, by definition, most indicative of class 0. The counterfactual generator will also favor the same set of words, due to its incentive to match the distributions.

Plot 640 of FIG. 2 illustrates the optimal strategy for the factual rationale under sparsity constraint:

$$\sum_{i=1}^{N}\mathbb{E}[Z_{0,i}^f] = \sum_{i=1}^{N} p_{Z_0^f|Y}(1\mid 1) \leq \alpha.$$ (Eq. 22)

The left-hand side in equation 22 represents the expected factual rationale length (in number of words). It also represents the area under the $p_{z_{0,i}^f|Y}(1|1)$ curve.

In one embodiment, parameter sharing is imposed among the players. Such sharing is motivated by the fact that both the factual and counterfactual generators adopt the same rationalization strategy upon reaching the equilibrium. Therefore, instead of having two separate networks for the two generators, one unified generator network is introduced for each class, a class-0 generator and a class-1 generator, with the ground truth label Y as an additional input to identify between factual and counterfactual modes. Parameter sharing may also be imposed between the two discriminators by introducing a unified discriminator, with an additional input t that helps to identify between the class-0 and class-1 cases. Both the generators and the discriminators include a word embedding layer, a bi-direction LSTM layer followed by a linear projection layer.

The generators generate the rationales by the independent selection process. At each word position k, the convolutional layer outputs a quantized binary mask Sk, which equals to 1 if the k-th word is selected and 0 otherwise. The binary masks are multiplied with the corresponding words to produce the rationales. For the discriminators, the outputs of all the times are max-pooled to produce the factual/counterfactual decision.

The training objectives are essentially equations 16 and 17 above. The main difference is that the constrained optimization in equation 17 is transformed into a multiplier form. Specifically, the multiplier terms (or the regularization terms) are as follows:

$$\lambda_1 \left| \frac{1}{K} \mathbb{E}[\|S\|_1] - \alpha \right| + \lambda_2 \mathbb{E}\left[\sum_{t=2}^{K} |S_k - S_{k-1}|\right] \quad \text{(Eq. 23)}$$

Where K denotes the number of words in the input text.

The first term constrains on the sparsity of the rationale. It encourages that the percentage of the words being selected as rationales is close to a preset level $\alpha$. The second term constrains on the continuity of the rationale. $\lambda_1$, $\lambda_2$, and $\alpha$ are hyperparameters. The $h_0(\cdot)$ and $h_1(\cdot)$ functions in equation 17 are both set to linear function, which empirically shows good convergence performance, and which can be shown to satisfy equation 18.

In one embodiment, to resolve the non-differentiable quantization operation that produces $S_t$, a straight-through gradient computation technique is applied. The training scheme involves the following alternate stochastic gradient descent. First, the class-0 generator and the discriminator are updated jointly by passing one batch of data into the class-0 generator, and the resulting rationales, which contain both factual and counterfactual rationales depending on the actual class, are fed into the discriminator with t=0. Then, the class-1 generator and the discriminator are updated jointly in a similar fashion with t=1.

EXAMPLE PROCESSES

Figure 7:
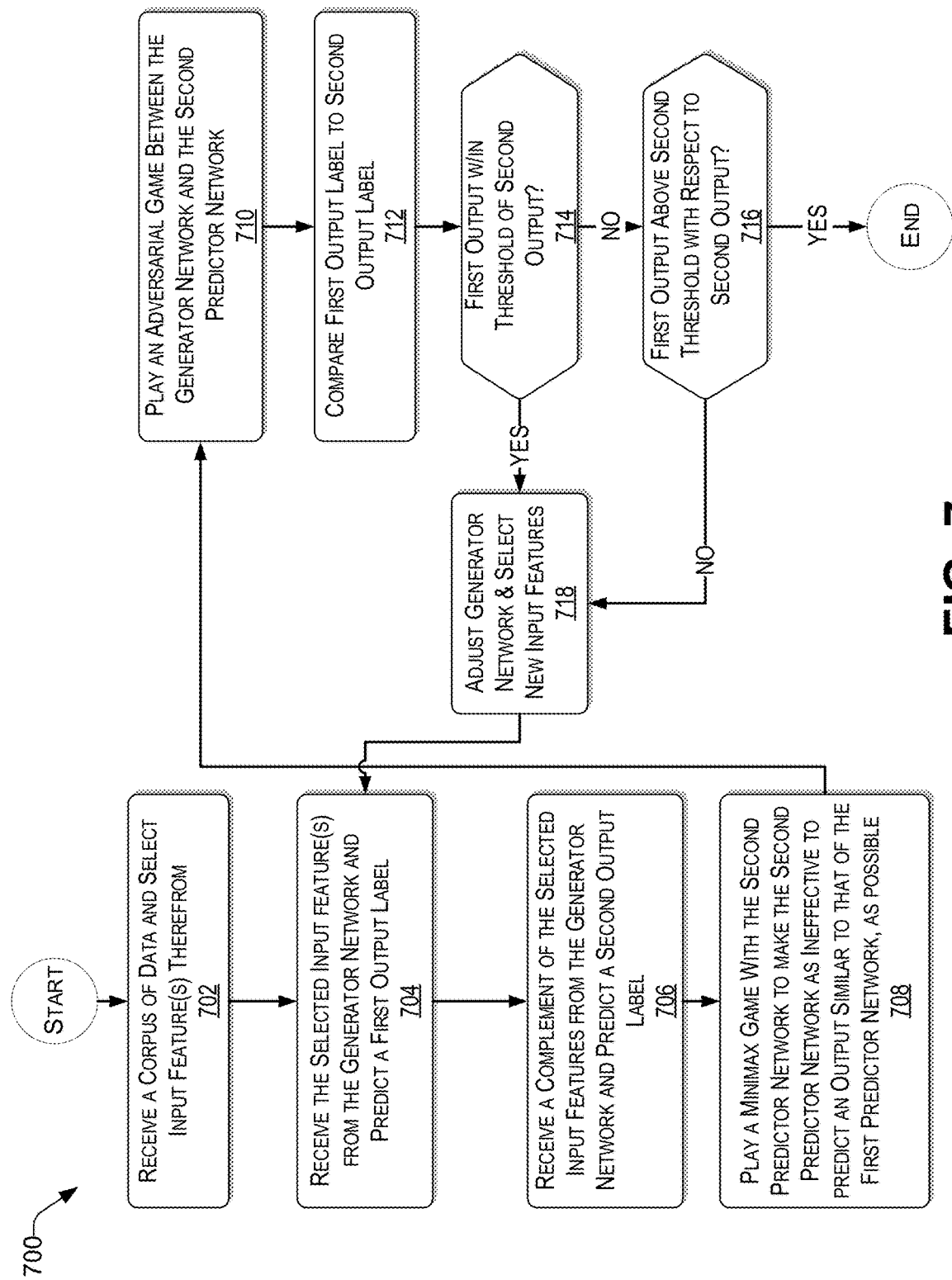
FIG. 7 presents an example process related of training a natural language processing network.

With the foregoing overview of the example systems 300 to 500, it may be helpful now to consider a high-level discussion of an example process. To that end, FIG. 7 presents an illustrative process related to performing training a natural language processing network. Process 700 is illustrated as a collection of blocks, each in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 700 is described with reference to the architecture of FIG. 3.

At block 702, a generator network receives a corpus of data and selects one or more input features from the corpus of data to represent a sentiment thereof. In one embodiment, the corpus of data is in natural language.

At block 704, a first predictor network receives the one or more selected input features from the generator network and predicts a first output label based on the received one or more selected input features. In some scenarios, the first predictor network may collaborate with the generator network to classify (e.g., predict) the corpus of data based on the set of selected input features.

At block 706, a second predictor network receives a complement of the selected input features from the generator network and predicts a second output label based on the received complement of the selected input features.

At block 708, the generator network plays a minimax game with the second predictor network to make the second predictor network as ineffective to predict an output similar to that of the first predictor network, as possible.

At block 710, the generator network plays an adversarial game with the complementary predictor network to make the second predictor network as ineffective to predict an output similar to that of the first predictor network, as possible.

At block 712, the first output label is compared to the second output label.

At block 714, upon determining that the first output label is within a predetermined threshold from the second output label (i.e., "YES" at decision block 714), the process continues with block 718, where the generator network is adjusted such that one or more input features of the complement of the selected input features are also selected by the generator network. The iterative process then continues with block 704.

However, upon determining that the first output is not within a threshold of the second output (i.e., "NO" at decision block 714), the process continues with block 716, where a determination is made whether the first output label is above a second threshold with respect to the second output label. If not (i.e., "NO" at decision block 716), the process continues with block 718, as discussed above. However, upon determining that the first output is above the second threshold with respect to the second output label (i.e., "YES" at decision block 716), the process ends, thereby indicating that all useful features from the corpus of input data have been harvested by the generator network to improve the quality of the determination of the output label by the first predictor network, while reducing the accuracy of the second predictor network.

Example Computer Platform

Figure 8:
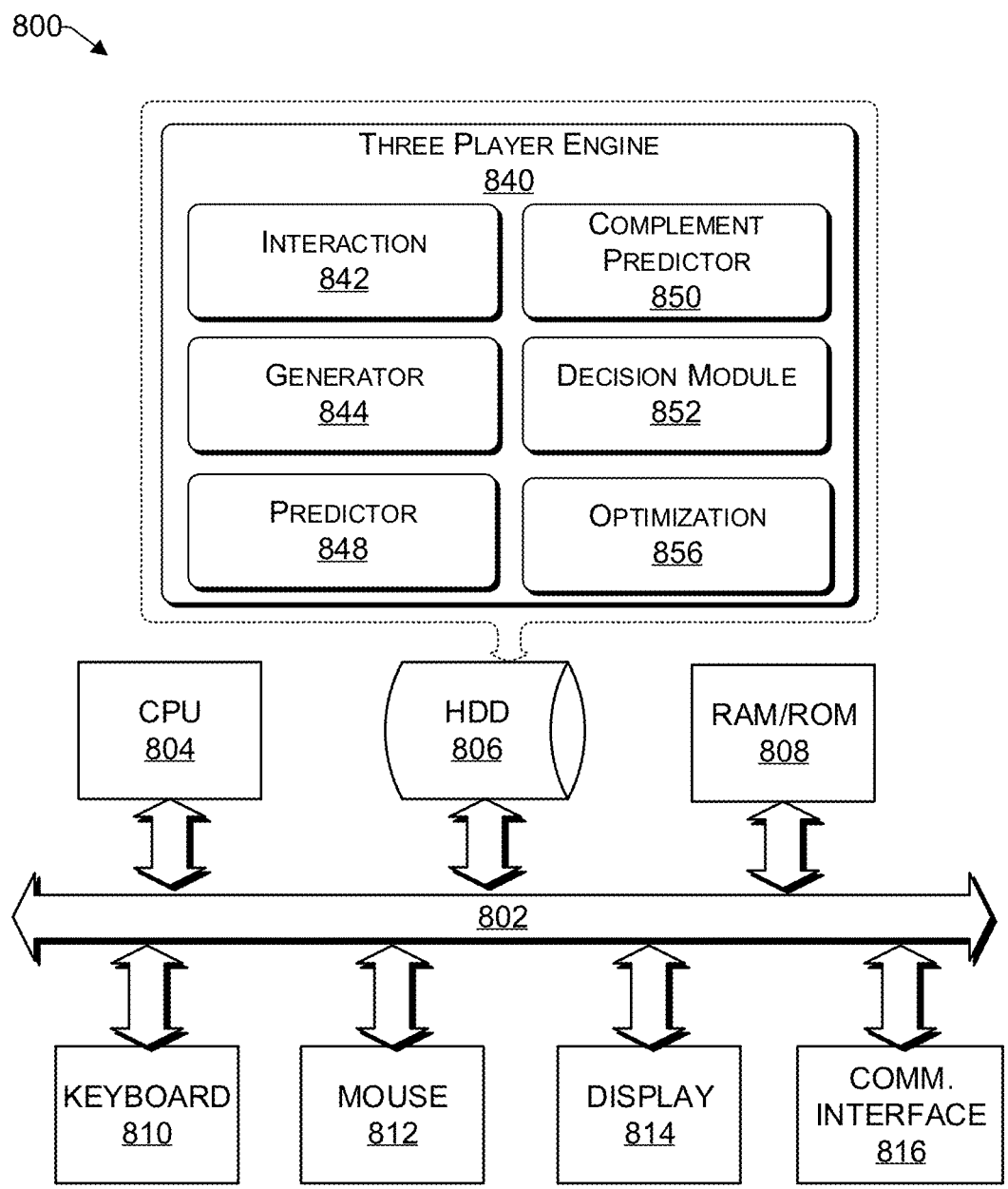
FIG. 8 provides a functional block diagram illustration of a computer hardware platform that can be used to implement a computing device that is particularly configured to train a natural language processing network.

As discussed above, functions relating to training a natural language processing network and determining a rational in a natural language processing system using CAR, can be performed with the use of one or more computing devices connected for data communication via wireless or wired communication, in accordance with the architectures of FIGS. 3 to 5. FIG. 8 provides a functional block diagram illustration of a computer hardware platform 800 that can be used to implement a computing device that is particularly configured to train a natural language processing network. In particular, FIG. 8 illustrates a network or host computer platform 800, as may be used to implement an appropriately configured computing device to host a three-player engine as discussed herein.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as the three-player engine 840, in a manner described herein. The three-player engine 840 may have various modules configured to perform different functions. For example, there may be an interaction module 842 that is operative to receive data from various sources over a network, wherein the data can be used by the three-player engine to perform sentiment analysis thereon.

There may be a generator network 842 operative to receive the corpus of data from the interaction module 802 and select one or more input features from the corpus of data. There may be a first predictor network module 848 operative to receive the one or more selected input features from the generator network module 844 and predict a first output label based on the received one or more selected input features.

There may be a second predictor module 850, sometimes referred to herein as a complement predictor module, that is operative to receive a complement of the selected input features from the generator network module 844 and predict a second output label based on the received complement of the selected input features. There may be a decision module 852 operative to determine whether the first output label is within a predetermined threshold from the second output label. In one embodiment, the decision module 852 determines whether the first output label is above a predetermined second threshold from the second output label.

There may be an optimization module 856 that is operative to finetune the generator network 844 such that it is able to select all relevant input features from the corpus of data, based on the feedback provided from the complement predictor 850 and the decision module 852.

In one embodiment, a program, such as Apache™, can be stored for operating the system as a Web server. In one embodiment, the HDD 806 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented system for training a natural language processing network, comprising:
   a generator network operative to receive a corpus of data and select one or more input features from the corpus of data;
   a first predictor network operative to receive the one or more selected input features from the generator network and predict a first output label based on the received one or more selected input features; and
   a second predictor network operative to receive a complement of the selected input features from the generator network and predict a second output label based on the received complement of the selected input features.

2. The system of claim 1, wherein the generator network is configured to play an adversarial game with the second predictor network to make the second predictor network as ineffective to predict an output similar to that of the first predictor network, as possible.

3. The system of claim 1, wherein the generator network is configured to play a minimax game with the second predictor network to make the second predictor network as ineffective to predict an output similar to that of the first predictor network, as possible.

4. The system of claim 1, wherein the complement of the selected input features is based on one or more input features not selected by the generator network for the first predictor network.

5. The system of claim 1, wherein the computer is configured to:
   compare the first output label to the second output label; and
   upon determining that the first output label is within a predetermined threshold from the second output label, adjusting the generator network to change a selection of the one or more input features from the corpus of data.

6. The system of claim 5, wherein adjusting the generator network to change a selection of the one or more input features from the corpus of data comprises: including input features from the complement of the selected input features from the generator network.

7. The system of claim 5, wherein the generator network is iteratively adjusted until the first output label is outside a predetermined second threshold from the second output label.

8. The system of claim 1, wherein the first and second output labels are binary.

9. The system of claim 1, wherein the training is unsupervised.

10. The system of claim 1, wherein the number of input features identified by the generator network is limited based on a computational capability of the computer.

11. The system of claim 1, wherein the generator network is an introspective generator that predicts a label before selecting the one or more input features from the corpus of data.

12. The system of claim 11, wherein the generator network has a classifier having an architecture that is similar to that of the first predictor network.

13. A computing device comprising:
   a processor;
   a storage device coupled to the processor;
   a program stored in the storage device, wherein an execution of the program by the processor configures the computing device to perform acts comprising:
   receiving a corpus of data by a generator network;
   selecting one or more input features from the corpus of data by the generator network;
   receiving the one or more selected input features from the generator network by a first predictor network;
   predicting a first output label by the first predictor network based on the received one or more selected input features;
   receiving a complement of the selected input features from the generator network by a second predictor network; and
   predicting a second output label by the second predictor network, based on the received complement of the selected input features.

14. The computing device of claim 13, wherein the generator network is configured to play an adversarial game with the second predictor network to make the second predictor network as ineffective to predict an output similar to that of the first predictor network, as possible.

15. The computing device of claim 13, wherein the complement of the selected input features is based on one or more input features not selected by the generator network for the first predictor network.

16. The computing device of claim 13, wherein execution of the program by the processor further configures the computing device to perform acts comprising:

comparing the first output label to the second output label; and upon determining that the first output label is within a predetermined threshold from the second output label, adjusting the generator network to change a selection of the one or more input features from the corpus of data by including input features from the complement of the selected input features from the generator network.

17. The computing device of claim 16, wherein the generator network is iteratively adjusted until the first output label is outside a predetermined second threshold from the second output label.

18. The computing device of claim 13, wherein the generator network is an introspective generator that predicts a label before selecting the one or more input features from the corpus of data.

19. A non-transitory computer readable storage medium tangibly embodying a computer readable program code having computer readable instructions that, when executed, causes a computer device to carry out a method of training a natural language processing network, comprising:

receiving a corpus of data by a generator network;

selecting one or more input features from the corpus of data by the generator network;

receiving the one or more selected input features from the generator network by a first predictor network;

predicting a first output label by the first predictor network based on the received one or more selected input features;

receiving a complement of the selected input features from the generator network by a second predictor network; and predicting a second output label by the second predictor network, based on the received complement of the selected input features.

20. The non-transitory computer readable storage medium of claim 19, wherein the generator network is configured to play an adversarial game with the second predictor network to make the second predictor network as ineffective to predict an output similar to that of the first predictor network, as possible.

21. The non-transitory computer readable storage medium of claim 19, wherein the complement of the selected input features is based on one or more input features not selected by the generator network for the first predictor network.

22. The non-transitory computer readable storage medium of claim 19, further comprising:

comparing the first output label to the second output label; and upon determining that the first output label is within a predetermined threshold from the second output label, adjusting the generator network to change a selection of the one or more input features from the corpus of data by including input features from the complement of the selected input features from the generator network.

23. The non-transitory computer readable storage medium of claim 22, wherein the generator network is iteratively adjusted until the first output label is outside a predetermined second threshold from the second output label.

24. The non-transitory computer readable storage medium of claim 19, wherein the generator network is an introspective generator that predicts a label before selecting the one or more input features from the corpus of data.

* * * * *